US 6,614,853 B1

(12) United States Patent
Koslar et al.

(10) Patent No.: US 6,614,853 B1
(45) Date of Patent: Sep. 2, 2003

(54) METHOD OF TRANSMISSION AND DEVICE TO CARRY OUT SAID METHOD

(75) Inventors: Manfred Koslar, Berlin (DE); Zbigniew Ianelli, Berlin (DE)

(73) Assignee: Nanotron Gesellschaft fur Mikrotechnik mbH, Berlin (DE)

(*) Notice: Subject to any disclaimer, the term of this patent is extended or adjusted under 35 U.S.C. 154(b) by 0 days.

(21) Appl. No.: 09/297,153

(22) PCT Filed: Nov. 3, 1997

(86) PCT No.: PCT/DE97/02589

§ 371 (c)(1),
(2), (4) Date: Apr. 26, 1999

(87) PCT Pub. No.: WO98/20624

PCT Pub. Date: May 14, 1998

(30) Foreign Application Priority Data

Nov. 1, 1996 (DE) ......................................... 196 46 745

(51) Int. Cl.$^7$ .................................................. H03K 9/06
(52) U.S. Cl. ....................................... 375/271; 375/139
(58) Field of Search ............................... 375/139, 271, 375/302, 322, 324, 340; 359/154, 115, 181; 370/521

(56) References Cited

U.S. PATENT DOCUMENTS

| 3,969,725 A | 7/1976 | Couvillon et al. |
| 4,255,791 A | 3/1981 | Martin |
| 5,070,500 A | 12/1991 | Horinouchi et al. |
| 5,105,294 A | 4/1992 | Degura et al. |
| 5,113,278 A | 5/1992 | Degura et al. |
| 5,325,394 A | 6/1994 | Bruckert |
| 5,381,798 A | 1/1995 | Burrows |

FOREIGN PATENT DOCUMENTS

| DE | 36 18 416 | 3/1987 |
| DE | 39 28 571 | 3/1990 |
| DE | 32 16 666 | 11/1992 |
| DE | 196 01 866 | 8/1996 |
| EP | 223 554 | 5/1987 |
| GB | 2 208 462 | 3/1989 |
| WO | WO 95/20277 | 7/1995 |
| WO | WO 96/18913 | 6/1996 |

OTHER PUBLICATIONS

Couch II, Leon W, *Digital and Analog Communication Systems*, Macmillan Publishing Co., NY, NY, 4th. ed. 1993.
Utlaut, W.F., "Spread–spectrum principles and possible application to spectrum utilization and allication", *telecommunication journal*, vol. 43, 1978, pp. 20–32.
Kowatsch et al., "Spread–Spectrum–übertragung analoger Signale mit Chirp–Modulation", *Archiv Für Electronic und Übertragungstechnik*, vol. 36, No. 7, Jul. 1982, pp. 299–304 (Document XP002061685).

*Primary Examiner*—Stephen Chin
*Assistant Examiner*—Kevin Kim
(74) *Attorney, Agent, or Firm*—Altera Law Group LLC

(57) ABSTRACT

Transmission method in which angle-modulated pulses with temporally opposite angle modulation are generated in the receiver during the duration of the pulse, which pulses are superimposed by means of a first superimposing element (8, 9), in each case in pairs, into a folded pulse, whereby the folded pulses transmitted to the receiver, after a modulation process, carry information impressed upon them, and these folded pulses are filtered at the receiver through two parallel-connected, complementary dispersion filters with frequency-dependent group delay characteristics, whereby the frequency-dependent group delay characteristics of the two dispersion filters are matched to the angle-modulation, in each case, of one of the two pulses forming in their superposition the folded pulse, in such a way that at the output of the dispersion filter, in each case, a combined signal appears that consists of one compressed pulse with increased amplitude and one expanded pulse with decreased amplitude, whereby the signals at the outputs of both dispersion filters at the receiver are combined by means of a second superimposing element.

15 Claims, 12 Drawing Sheets

METHOD OF TRANSMISSION AND DEVICE TO CARRY OUT SAID METHOD

FIELD OF THE INVENTION

Figure 1A:
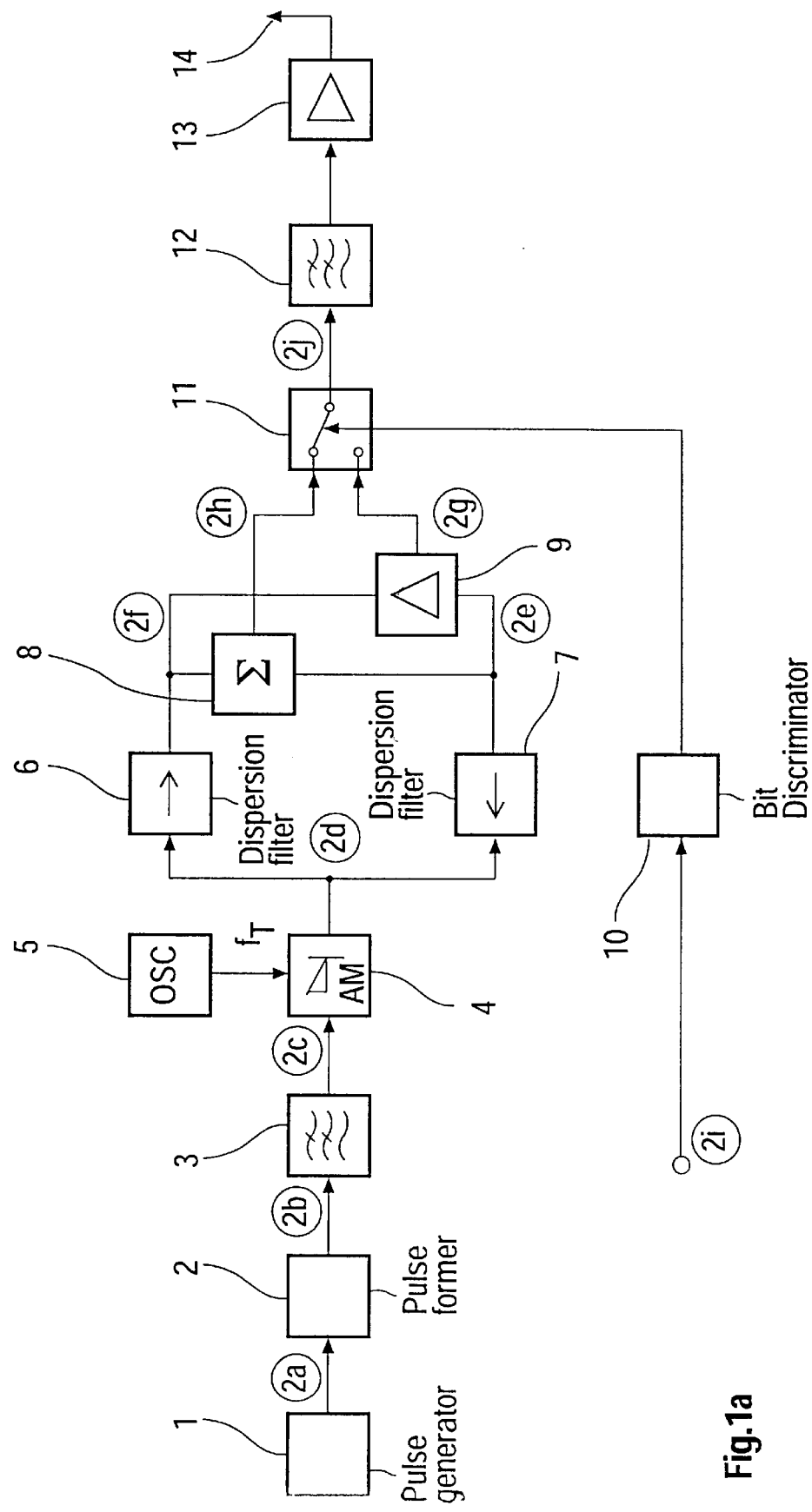

The invention concerns a transmission method in accordance with the precharacterizing clause of claim 1, as well as a transmitter-receiver arrangement for execution of the method in accordance with the precharacterizing clause of claim 7.

BACKGROUND OF THE INVENTION

In the case of known transmission methods, the communication to be transmitted is modulated in the transmitter onto a high frequency carrier signal and forwarded over the transmission distance to the receiver, which, for recovery of the communication displays an appropriate demodulator. There exists comprehensive literature concerning modulation of analog signals. Modern communication methods use digital or digitized data, since these types of signals can be processed rapidly and in cost-effective fashion by means of signal path processor technology, with the means available today, even in the case of a large amount of information.

If the communication signal to be transmitted is present in digitized form as a bit sequence—as is the case in modern mobile radio networks—then modulation is accomplished by changing the frequency, the phase or the amplitude of the carrier signal as a function of the particular value of the information of the bit series to be transmitted. As concerns digital modulation of carrier signals, known from COUCH, L. W.: Digital and Analog Communication Systems, 4th Edition, Macmillan Publishing Company (1993) are various digital modulation methods, for example Amplitude Shift Keying (ASK), Two-Phase Shift Keying (2-PSK), Two-Frequency Shift Keying (2-FSK), or more recent methods such as the spread spectrum modulation method. In each case, demodulation takes place in the receiver corresponding to the modulation method used at the transmitter, and therewith recovery of the digital communication signal as bit sequence in the form of pulses following one after the other. A known modulation method of communication technology, as mentioned, provides angle modulation as the generic term for frequency or phase modulation. In the case of the known methods, this type of modulation, however, serves exclusively for the purpose of superimposing the communication onto a carrier.

With all the methods of this type, there exists the disadvantage that the quality of the communication signal recovered at the receiver decreases strongly with the distance between receiver and transmitter, with disturbance elements over the transmission distance.

In order to achieve a prescribed protection against disturbances over a desired range in the case of transmission of a communication over a disturbance-encumbered transmission distance, transmitter power may not drop below a predetermined value.

First, the therewith required high transmitting power has the disadvantage that the radiated power during transmitting operation is correspondingly high, which, in particular in the case of battery-operated devices, as with mobile telephones, is disturbing because of rapid battery depletion. Secondly, there exist fears that the electromagnetic radiation emanating from the transmitter can lead to damage to the human body. This is to be taken into consideration in particular in the case of mobile telephones because of the comparatively short distance to the user.

SUMMARY OF THE INVENTION

The task underlying the invention is to obtain a transmission method of the initially mentioned type, or to be precise, a receiver-transmitter arrangement for execution of the method, which, with in general at least transmission quality remaining the same, enables a reduction in transmitting power or an increase in range.

This task, starting out from a method in accordance with the precharacterizing clause of claim 1, is resolved by its characterizing features, or relative to the arrangement for execution of the method, by the features of claim 7.

The invention includes the technical teaching to transmit "folded (doubled) pulses" between transmitter and receiver, which are specially designed pulses that are defined in more detail later. These folded pulses, because of their particular characteristics, can be used not only for raising the amplitude by appropriate compression methods with correspondingly suited dispersion filters, but also because of their particular, highly correlative properties can be used for additional correlative and auto-correlative suppression of noise compared to the signal. The particular modulation and the special composition of these transmitting elements, called here "folded pulses", permit raising the signal-to-noise ratio in the analog signal processing at the receiver. In this way there can be achieved through an improvement of the signal-to-noise ratio in the receiver a reduction of transmitting power or an increase in range or alternatively a reduction of the error rate.

To be understood here under the concept "folded pulse", and in what follows, is the superposition of at least two opposed, angle-modulated pulses (components) having essentially the same duration—in their basic form also designated as "chirp signals", whereby the angle modulation of the two pulses results from the fact that the frequency of the one component changes, in the mathematical sense increasing monotonically during the duration of the pulse—and in the second pulse component decreasing monotonically. The folded pulse is, therefore, to be defined as that it simultaneously consists of at least two angle modulated pulses (chirp signals) at a frequency varying counter to each other, with the relative phase position of the components to each other also capable of further being used for differentiating these types of signals.

For a better understanding of chirp signals, the components of the "folded pulses", let first their basic properties and next the special, advantageous properties of the folded pulses be dealt with.

An angle modulated pulse of a certain time duration $\Delta t$ having a certain frequency deviation $\Delta f$ is, among other things, capable of being characterized by its time-bandwidth product $\Psi = \Delta t \cdot \Delta f$. Through special, so-called "dispersion filters" that are four-polar with a defined differential delay time behavior, it is possible to push together, that is to say, compress such angle-modulated pulses along the time axis, in the receiver. The energy of the original pulse of duration $\Delta t$ [s] having the amplitude $U_0$[V] across the resistance $R_1[\Omega]$, which is given by the expression $(U_0^2 \cdot \Delta t)/R_1$, is retained in compression, in the first instance, as assumed loss-free dispersion. Accordingly, for the shorter compressed pulse of duration $\delta$ one can estimate the energy with $(\hat{U}^2 \cdot \delta)R_1$, where $\hat{U}$[V] represents the increased pulse amplitude resulting from compression.

Hence one obtains $$(U_0^2 \cdot \Delta t)/R_1 = (\hat{U}_2 \cdot \delta)/R_1$$

Accordingly, the ratio of the squares of the voltages is equal to the inverse ratio of the times between the originally transmitted pulse of duration Δt and the average duration δ of the compressed pulse, applicable, therefore $$\hat{U}^2 = U_0^2 \cdot \Delta t/\delta = U_0^2 \cdot \Delta t \cdot \Delta f = U_0^2 \cdot \Psi,$$

where $\delta = 1/\Delta f$. Accordingly, the voltage in the receiver is raised by compression by a factor that corresponds directly to the root of the time/bandwidth product.

Hence, the chirp pulse, when it is compressed through dispersion filters, produces a first improvement of the signal-to-noise ratio. Because the signal-to-noise ratio ρ[dB] is defined by 20times the logarithm of the ratio of the signal voltage Û[V] to the noise voltage Ur[V], With the above equations on obtains:

$$\rho = 20\log(\hat{U}/Ur) = 10\log((U_0^2/Ur^2)\psi) = 10\log(U_0^2/Ur^2) + 10\log\psi$$

whereby can be seen that the S/N ratio ρ is improved by the portion +10logψ.

These relationships are known and at the present time are used, for other reasons, only in radar technology and for transmission of signals in optical lines, however not for general communications transmission. However, the chirp signals have yet another property, not used until now, that permits a second improvement of the S/N ratio.

By multiple correlation of several chirp signals, capable of being achieved in the form of the folded pulses is an automatic correlation in the receiver that causes a further, additional, very impressive S/N gain, over that capable of being achieved by the compression of the type represented above by, for example, multiplication of folded pulses.

This relies on the possibility of obtaining combinations of such chirp pulses in the form of folded pulses, which, with the use of dispersive filter arrangements, makes it possible to time shift by means of the delay properties of the filters the original components running differently on the time axis, such that coincident signals can be generated in such a manner that this time shift can be used for correlation of the signals.

In this manner, the folded signals can be characterized as highly correlated communication signals which, for several reasons, can be ideally used for communications transmission. Indeed, in the first instance, because of their length and bandwidth they cause a loss in bit rate, however allow at the other end, here the receiver end, a clear gain in noise reduction of the most varied of disturbing elements, including white noise, therefore unavoidable thermal noise.

They are highly correlated because several physical conventions between transmitter and receiver must be met, and the dispersive filters must also be matched to the phase characteristic of the transmitted folded pulse in the receiver. These are:

1. the frequency position of the carrier frequency (middle frequency),
2. the bandwidth of the frequency of the angle modulated pulses (frequency deviation),
3. the angle modulation time characteristic of the transmitting pulse components,
4. the time duration of the folded pulse,
5. the direction of the angle modulation (monotonically increasing or decreasing frequency with time) and their overlap,
6. the phase position at a prescribed point in time within the time duration of the angle modulated pulse, and the phase position of the components relative to one another, and
7. the amplitude of the angle modulated pulse.

These parameters between transmitter and receiver can be freely agreed upon, up to the seventh one, in order to serve as information carriers with correspondingly embodied receivers.

They permit a wide variation in the parameters beneficial to information transmission. The transmission speed, hence the bit rate, used to be the most important goal of the configuration of transmission systems. Actually, in the first instance it is lowered by the time duration of lengthened pulses. Channel capacity can be increased by operating, through time or frequency multiplexing methods, different channels independently at different times or at different frequencies or with different frequency-time modulation characteristics and different folded pulse combinations. The bit rate per channel times the number of possible channels only then yields the total amount of transmittable information content per unit of time.

Therefore, the variability of the above parameters, which extend over the time and frequency position, allows an additional gain, when the above mentioned variables are agreed upon in different conventions between transmitter and receiver.

These deliberations show that chirp pulses, especially folded pulses, can almost be perceived as a special "carrier substrate" for transmission of actual communications. This modulation, therefore, occurs independently of the modulation provided for the communication, which should be, as much as possible, orthogonal to the first. The modulation, to be characterized here for the sake of clarity as carrier substrate modulation, therefore produces an additional relationship or correlation between transmitter and receiver, and additionally serves to eliminate noise, primarily thermal noise and also other disturbing elements, because these latter can not display this added modulation.

The transmission method represented here for transmitting communications signals between a transmitter and a receiver over a disturbance-burdened transmission distance represents a combination of one of the known types of pulse modulation or types of pulse code modulation, and a special angle modulation acting orthogonal to the first type of modulation, with the base-band signals of the communication capable of being generated, for example, in Pulse Position Modulation (PPM) or Pulse Code Modulation (PCB) or Pulse Amplitude Modulation (PAM) or in Differential Pulse Code Modulation (DPCM) or as Pulse Delta Modulation or Spread Spectrum modulation, or one of the known modifications of these types, in a manner corresponding to the prior art.

These communication-related modulations of the analog or digital signals, however, are here modulated onto a carrier oscillation, which is not generated in the transmitter device during the duration of the pulse as usual from a carrier frequency that is constant in frequency, but rather the carrier frequency is additionally multiply angle modulated such that, for one thing, the angle modulation components that are reverse to one another in the case of the folded pulse, and for another thing the amplitude change as signal information or the pulse interval values (in the case of PPM) of the angle modulated carrier, are executed simultaneously and for a different purpose, as a combination of modulation types that are independent of one another, so-called "modulation types orthogonal to one another", with the known types of modulation serving for transmitting the communication and, additionally, the angle modulation combinations in the special form of folded pulses being used as signals that are capable of being highly correlated using dispersive filter arrangements for correlative noise suppression.

The sequence of such folded pulses is transmitted to the receiver over the transmission distance that is generally disturbed by interference from other transmitters and by white noise. The concept "transmission distance" is to understood here as being general, and includes wireless transmission distances where information transmission from transmitter to receiver is accomplished by means of electromagnetic waves, as well as line-connected transmission distances where transmitter and receiver are preferably connected together over light wave conductors, coaxial cable or simple electrical lines.

Moreover, the invention can be used in the case of data storage, for example on magnetic data carriers. In this case, the transmitter is designed as a writing unit that writes the data on the data carrier, while the receiver is constructed as a reading unit that reads out the stored data from the data carrier.

The receiver can demodulate the two modulation types that are orthogonal to one another, with the receiver, for this purpose, in the progression of its block diagram, displaying between antenna and rectifier dispersive filters of the type defined in accordance with the invention, where such filter arrangements are indicated that serve for automatic signal-to-noise improvement through the correlative properties of the folded pulses, and are simultaneously capable of still raising these signals in their amplitude by compression.

Since the chirp signals contained in the folded pulses permit a gain in the signal-to-noise ratio through compressibility of the signal amplitude, and the dispersion filters can be arranged such that their properties that are inverse to each other generate two mirror-symmetrical output signals from the chirp signal components, these simultaneous, correlated pulses can be added, multiplied or subtracted, cut out or suppressed, and in this way offer a quasi-autocorrelative emphasis of signal versus noise.

Another very critical consideration can be derived from the circumstance that the rise time of the compressed pulse corresponds to the full bandwidth of the chirp signal and, in its time position, is defined very exactly within a receiving arrangement. Consequently, this transmission method is plainly predestined for pulse position modulation (PPM). Even if one would always send out two chirp signals, the first of which served as the time reference for the interval to the second pulse following it, the total duration would be only 2.5 times the pulse duration. A signal of this kind can be used for analog signal transmission, but also for transmission of digital signals, to the extent, however, that the increased channel capacity through the increased bandwidth is likewise used.

The dispersive filter arrangements, as they will be presented later in examples of applications, can simultaneously fulfill several functions, and therewith reduce the needed expenditure in possible receiver structures.

First, they cause a increase of the signal versus noise by mere compression of the folded pulse components.

Second, these arrangements simultaneously enable the folded pulse components, through appropriate arrangements of the filters, to lead to coincident mirror-symmetrical signals, which, by automatic correlation, lead to a further gain relative to the S/N ratio.

Third, added in the case of a multiplication of the coincident and compressed signals with autocorrelative multiplication of signals of like frequency position (mirror-symmetrical frequency position) is that, without further filters an automatic, multiplicative and coherent demodulation of the compressed signal will be effected, which otherwise could only be achieved with expensive PLL circuits.

If in the receiver one controls the folded pulse, as it was defined initially, across two parallel connected dispersion filters with reversed complementary dispersion, two mirror-symmetrical signals arise at both outputs of these filters.

In the case of angle modulated folded pulses, the two dispersion filters have two characteristic curves acting inversely to each other. While the phase response over the frequency is, in each case, parabolic, the group delay time derived therefrom over time is a straight line which also rises with rising frequency, while the other filter acts in complementary fashion to the characteristic of the group delay time, therefore the group delay time becomes greater with rising frequency.

Hence, in the case of linear frequency modulated pulses, the group delay time characteristic is a straight line. In the case of non-linear frequency modulation, group delay time of the dispersive filter at any one time represents the internal function concerning the modulation characteristic at that time. Therefore, in the case of complementary, non-linearly modulated folded signal components, the demodulated dispersion filters display corresponding complementary group delay time characteristics.

Since the superposed portions of the folded pulse consist of two components, and these two portions are connected to two inversely-acting, parallel-connected dispersion filters, four processes take place at the same time:

In the case of the component that displays a frequency increasing with time (positive frequency pattern), the higher frequency portions are delayed relative to the frequency by one of the two parallel-connected filters having a negative group delay time characteristic. By this means, the originally positively chirped signals are compressed, with the counter-running, negatively chirped folded pulse components being expanded with respect to time to double the duration of the initial pulse.

The other filter acts in reverse, because it delays the lower frequencies more strongly than the high frequencies (positive group delay time characteristic), whereby the component running from high frequencies to low frequencies is compressed, and the pulse component running from low frequencies to high frequencies is expanded to double the duration of the initial pulse.

Hence, the two dispersion filters, in each instance with one of the two angle-modulated pulses forming in their superposition the folded pulse, lead to a time compression with an increase in amplitude corresponding thereto, whereas the other pulse portion is expanded to double the duration, which leads to a corresponding decrease in amplitude.

Since the noise at the input is not correlated in comparison to a signal of that type, but rather, because of the dispersion properties of the dispersive filters was not changed in the same way, the noise signal is uncorrelated to the signal at the output of the two filters.

Therewith, in the analog section of the receiver, by means of analog signal processing, one can make use of certain principles that can be used for noise suppression, and actually to a large extent independently of one another, as simulations have shown.

For practical implementation of the dispersion filters required by the system, serving this purpose nowadays, based on the prior art, are preferably Surface Acoustic Wave (SAW) filters, since these types of filters can be manufactured with high reproduction accuracy and stability. Moreover, these types of surface acoustic wave filters offer the advantage that amplitude response and phase response can be dimensioned independently of one another, which opens up the opportunity of developing in a single unit the narrow bandpass filter and the dispersion filter needed in each receiver. The configuration of the dispersion filter as a SAW filter module further advantageously enables the integration of several dispersion filters together with low pass filtering, addition and subtraction on a substrate, so that it can become possible to obtain a compact SAW element as the core of the arrangement in accordance with the invention.

Therefore, a SAW filter element on a substrate is preferred, the SAW filter comprising two parallel dispersive filters acting inversely to each other, having two inputs and outputs and each with additional outputs for the sum and difference of the output signals. These functions could all be installed on a single substrate. The normally differential inputs and outputs were represented here, for the sake of simplicity for block diagrams, only by a line.

The transmission method in accordance with the invention, relative to the angle modulation proposed for the transmitter end is, as can be seen, not limited to a linear frequency change during the duration of the pulse. It is critical that the delay time characteristic of the dispersion filters provided on the receiver end be adapted to the angle modulation of the two pulses forming the folded pulse by their superposition at the transmitter end in such a way that there appear at the output the dispersion filters arranged at the receiver end a combined signal that consists of a time-compressed pulse with correspondingly increased amplitude and a time-expanded pulse with correspondingly reduced amplitude.

These two combined signals can now be either added, subtracted or multiplied and, as shown, will hereby, or by suppression or by cutting out the coincident portion, be used for improvement of the S/N ratio in the receiver.

The addition of the combined signals yields a superposition of the compressed signal portions, as well as an superimposing of the doubly-expanded chirp signals, and an addition of the noise arriving along the transmission path. Since the compressed signals reach the addition stage coincidently, their signal amplitudes are added, hence doubled. Accordingly the signal is increased by 6 dB. The noise, however, which is not correlated and whose phase and amplitude vary, can only be added relative to the power. Therefore, its amplitude increases statistically only to 3 dB. Accordingly, there results an average signal-to-noise improvement of 3 dB, because, in the case of the signal, based on the simultaneous occurrence, the voltages are added, and in the case of noise, based on the statistical occurrence only the powers are added. The coincidence of the mirror-symmetric compressed components at the output of the dispersion filters arranged at the receiver end therefore leads to an S/N gain only for a folded signal in the event of its summation.

Subtraction of the combined signals, depending upon the phase position of the folded components of the folded signal relative to one another, leads to an improvement of the signal-to-noise ratio. Depending upon phase position of the signals, addition and subtraction are merely complementary processes to one another.

In the case of multiplication of the two combination signals arising at the output through the parallel-connected dispersion filters, similar conditions arise, as known from autocorellation.

In the case of the known autocorrelation method, periodic or quasi-periodic signals are offset through a delay line for about the duration of the period and are multiplied with the arriving signal that is not conducted over a delay line. The uniformity of a signal after a duration of one period leads to squaring of the then coincident amplitudes. The noise, however, while not capable of being correlated by the delay line, is hereby suppressed, as is well known. Autocorrelation belongs to the most efficient—although not linear—method for bringing into prominence periodic or quasi-periodic signals as compared to noise, therefore to raise the signal/noise interval.

The same physical effect can very advantageously be achieved for the folded signal. Since the folded signal is composed in such a way that it generates two combined and coincident output signals that are symmetrical to one another, by means of two parallel-connected dispersion filters having a dispersion direction inverse to one another, said output signals being characterized by the fact that located in their time center, in both branches, are compressed signal portions that are magnified. Multiplication of these magnified signals that are compressed over a narrow time range leads to squaring of the signal amplitudes.

The noise, however, is not correlated and besides was expanded in its time pattern, through the dispersive filters, hence also lowered in its amplitude. Multiplication of the noise portions therefore leads, relative to the squared signal, to a very much lower amplitude.

Accordingly, a similar physical effect occurs here as in the case of the auto-correlation of the periodic signals, here with an aperiodic signal. Although the auto-correlation equation for folded signals would appear to be different than for periodic signals, since it is not the signals that will be offset by the duration of the period through one a delay line, but rather there being present two frequency-dependent delay lines having a dispersion direction the reverse of one another, which act reciprocally on the folded signal such that the compressed signals and the expanded signals appear coincidentally in a sort of timed mirror-symmetry, occasioned by the reciprocal multiplication is an impressive suppression of noise.

While normal autocorrelation presumes periodic or quasi-periodic signals, it is not usable on digital sequences, for example the pulse code modulation method. The folded signal, however, is a signal of a specific duration that does not repeat itself. Nevertheless, as was demonstrated, it is in itself automatically capable of being correlated.

Generation of the angle-modulated pulses, which in their superposition form in each case a folded pulse, can be accomplished, in accordance with the prior art, is several ways, of which some will be briefly described in the following.

In one variant of the invention, as an approximation, a Dirac pulse is first generated and fed to a low-pass filter whose filter characteristic displays a peak shortly before reaching the limit frequency, and therewith converts the Dirac pulse into an sinc pulse (split pulse), whose form is described by the known sinc function $(x)=\sin x/x$. The sinc form output signal of the low-pass filter is next given over to an amplitude modulator, which impresses onto the carrier oscillation a sinc-form envelope. If the signal generated in this fashion is added to a parallel circuit of two dispersing filters having characteristic curves that are the reverse of each other, then appearing at the output of both filters are two angle-modulated chirp signals, through whose addition or subtraction arise two different folded pulses, that can be designated here as so-called "sum or difference signals"—both are folded pulses with a different phase position with respect to one another.

According to a preferred configuration of the invention, generation of the frequency modulated pulse, on the other hand, is by means of a PLL loop (PLL: Phase Locked Loop) and a Voltage Controlled Oscillator (VCO). The individual pulses of the input signal that are present in digital form are first converted for this purpose into sawtooth-shaped pulses through an integrator, whereby the direction of ascent of the individual pulses depends upon the amplitude of the input signal. The signal generated in this fashion is then used for control of the VCO, so that the frequency of an output pulse during the duration of the pulse increases or decreases linearly as a function of the level of the input signal. If two oppositely running chirp signals are generated simultaneously by a suitable circuit of this kind, then the folded signals can be generated either by addition or subtraction as sum or difference signals.

According to another advantageous embodiment of the invention, generation of the frequency modulated pulses in the transmitter is accomplished by a digital signal processing unit, which advantageously enables the realization of arbitrary frequency patterns during the duration of the pulse.

As a rule the information to be transmitted is present in digital form as a binary signal where in a simple variant of the invention, the impressing of this information upon the folded pulses takes place by the fact that only during a logical HIGH-level of the information-carrying input signal is a folded pulse transmitted, while a logical LOW-level of the input signal leads to a transmission pause. The reverse of this convention is also possible.

What is decisive in this variant of the invention is merely the fact that only one logical level of the information-carrying input signal is actively transmitted.

In contrast to this, in the preferred implementation form of the invention both a logical HIGH-level and a logical LOW-level of the information-carrying input signal are actively transmitted, which leads to an increased security against noise. For this purpose, on the transmitter end two different folded pulses are generated, depending on the then-existing binary value of the input signal.

Thus, it is advantageous to transmit during a HIGH-level of the information-carrying input signal a folded pulse that consists of the sum of two oppositely angle-modulated pulses. During a LOW level of the input signal, a folded pulse consisting of a subtraction of two oppositely angle-modulated pulses is then appropriately generated. Accordingly, these two different folded pulses are distinguished from each other by the relative phase position of the folded-pulse components in each case.

In addition, these signals are applicable for almost all modulation processes known hitherto. However, they are ideally suited for pulse position modulation (PPM), in which the reduction of the bit rate does not matter so much, because for this a maximum of only two pulses are required; with synchronous processes only one pulse is required.

Furthermore, it can be advantageous to actively transmit both logical LOW-levels and logical HIGH-levels of the information-carrying input signal through in each case one folded pulse, the position of the transmitted folded pulse being preset depending on the then-existing value of the information-carrying input signal.

In this variant of pulse position modulation the invention is not limited to a binary input signal that exhibits merely two different signal levels, but rather is also applicable generally to digital input signals where folded pulses of different positions can represent a multiple bit level corresponding to the possible number of different signal levels of the input signal.

The transmission method according to the invention is not, however, limited to the above-described exemplary modulation methods, but rather can be combined with a great number of modulation methods, which methods, and others, are described in the publications named in the introduction insofar as reference is made to the contents of these publications. Even the modern spread spectrum modulation methods can be provided with the angle-modulated carrier substrate, in order to here effect a reduction in the white-noise level, which until now was not possible.

Other advantageous further developments of the invention are characterized in the dependent claims or are presented in detail with the aid of the figures, together with the description of the preferred implementation examples of the invention.

BRIEF DESCRIPTIONS OF THE DRAWINGS

Figure 1B:
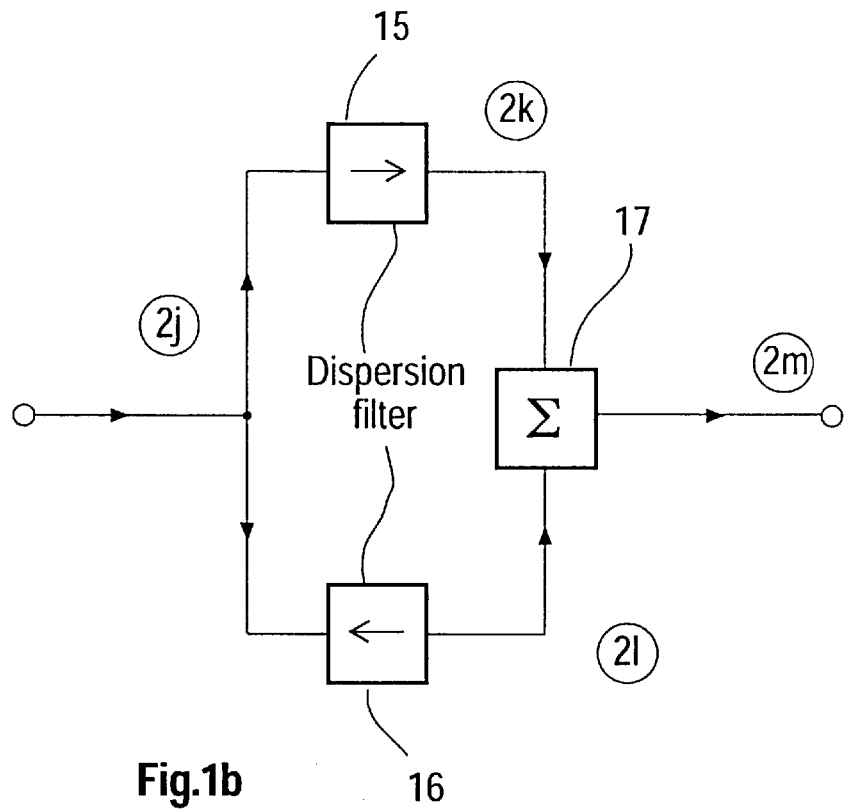
Figure 1C:
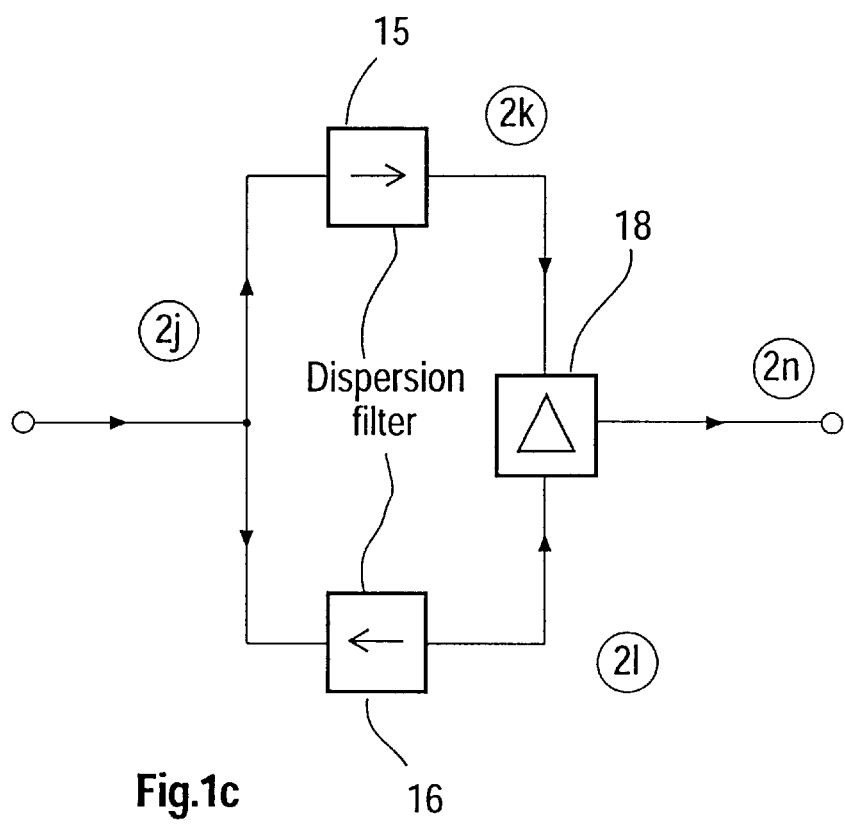
Figure 1D:
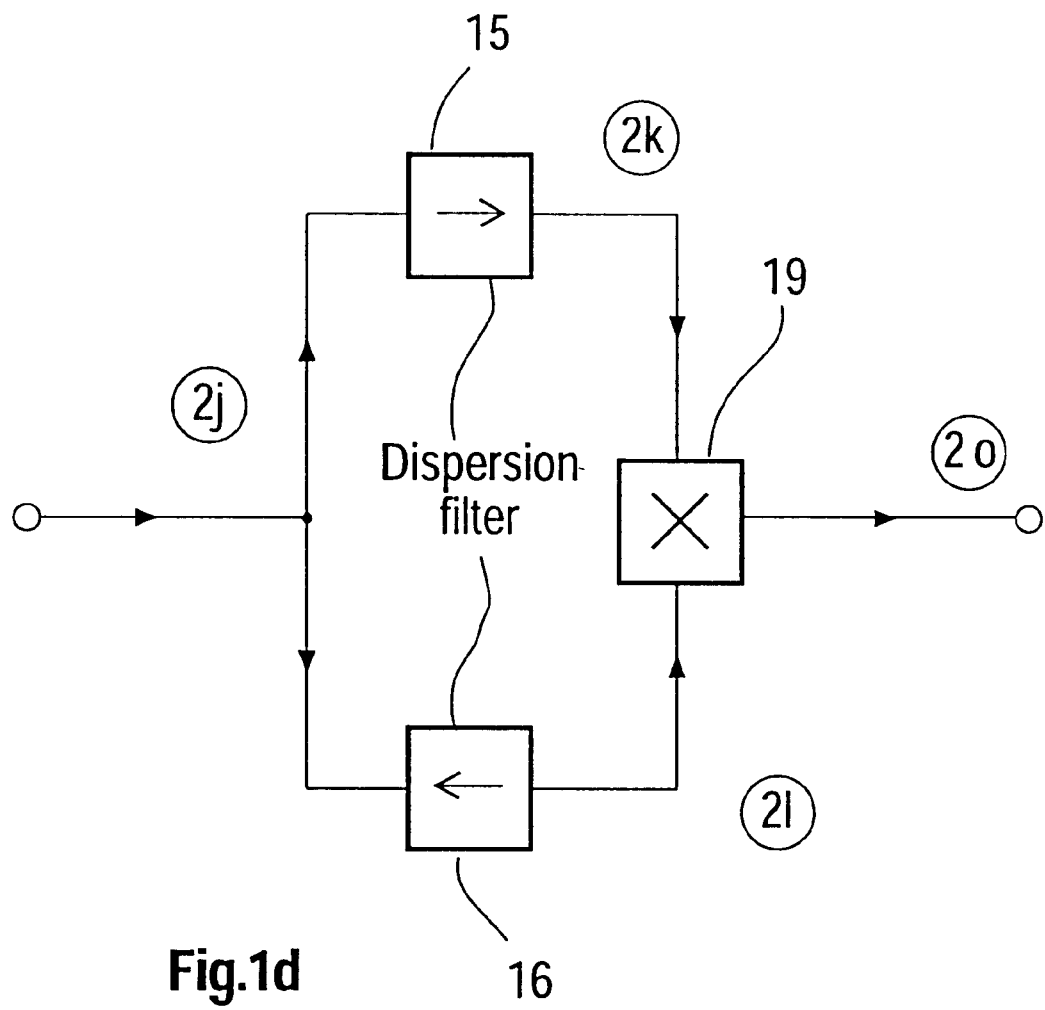
Figure 1E:
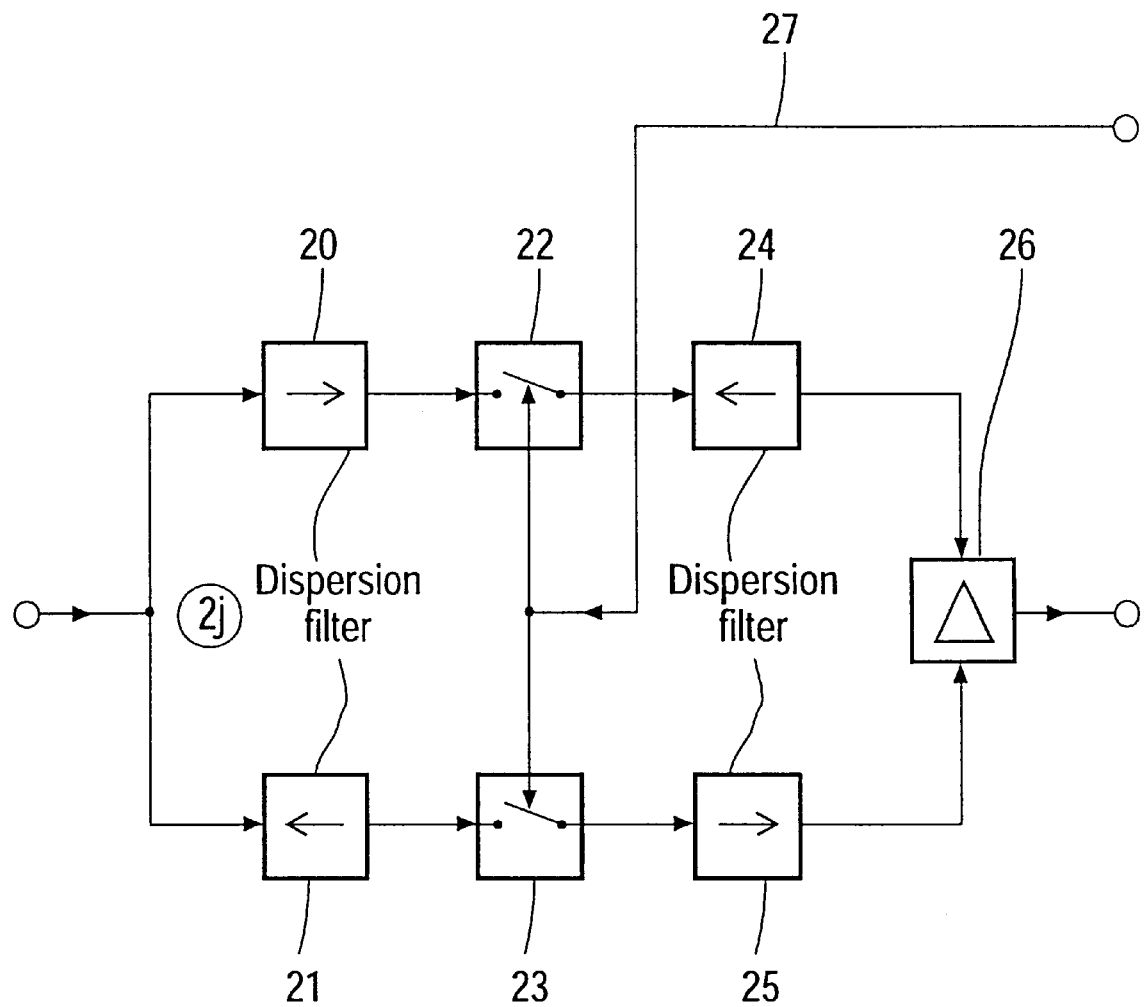
Figure 1F:
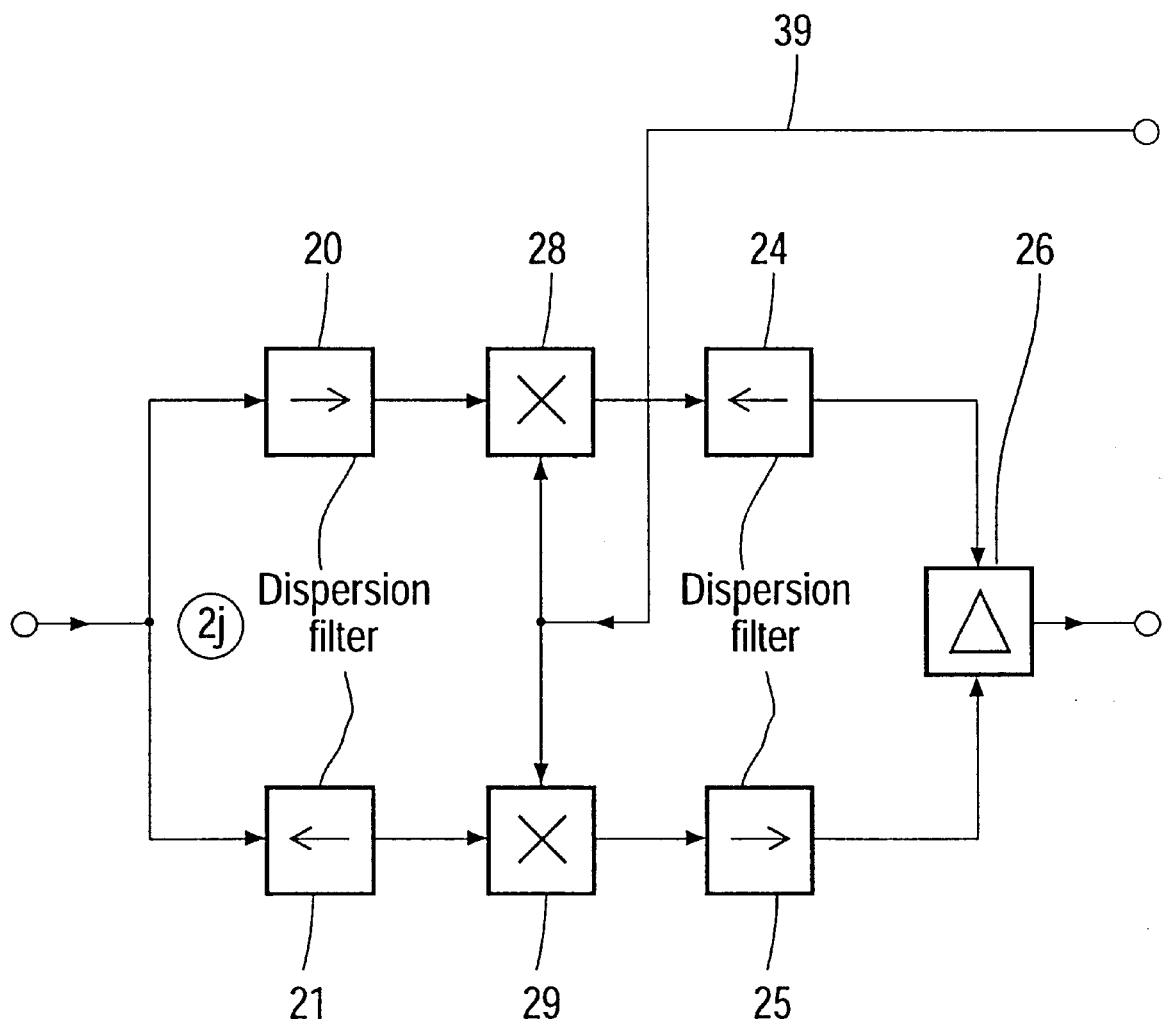
Figure 2A:
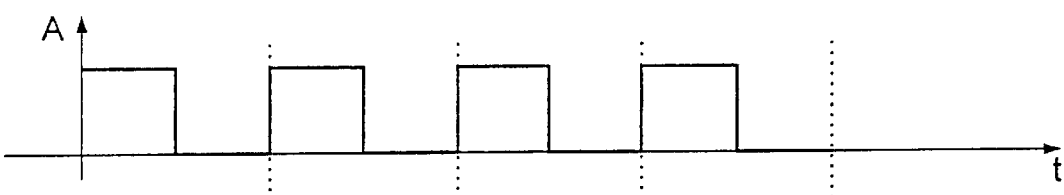
Figure 2B:
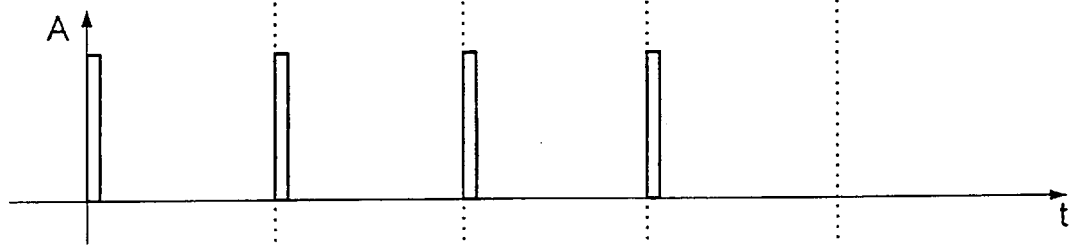
Figure 2C:
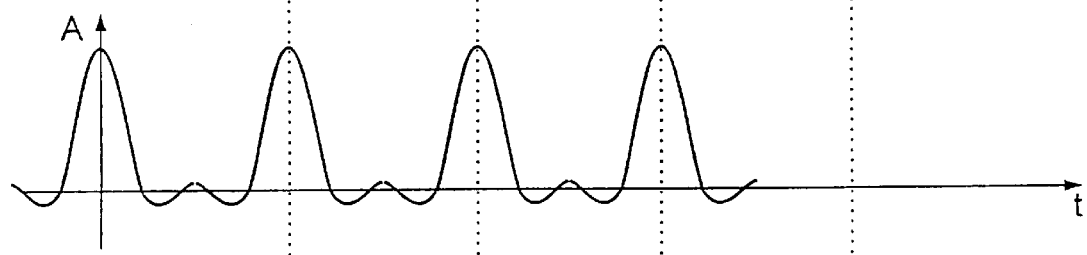
Figure 2D:
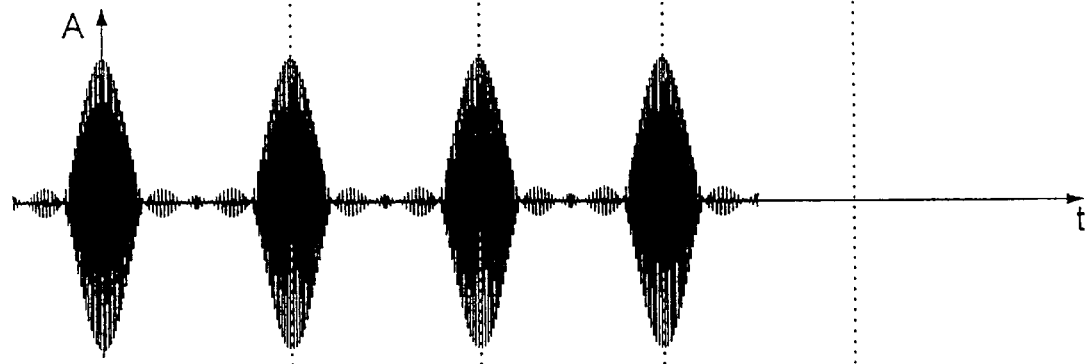
Figure 2E:
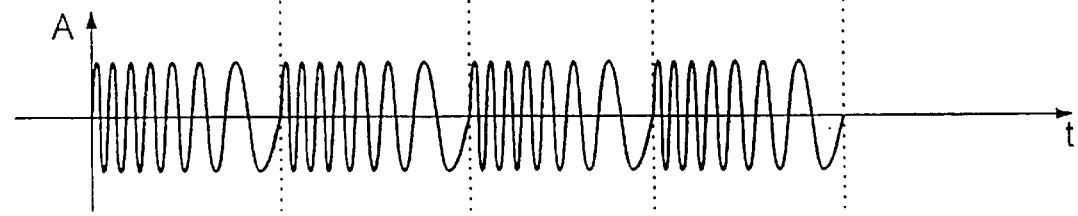
Figure 2F:
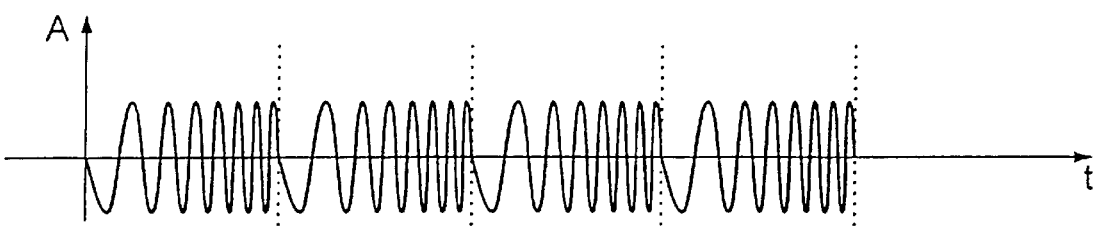
Figure 2G:
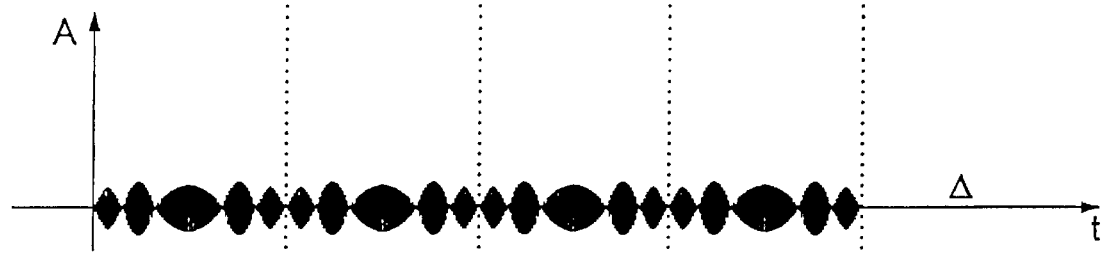
Figure 2H:
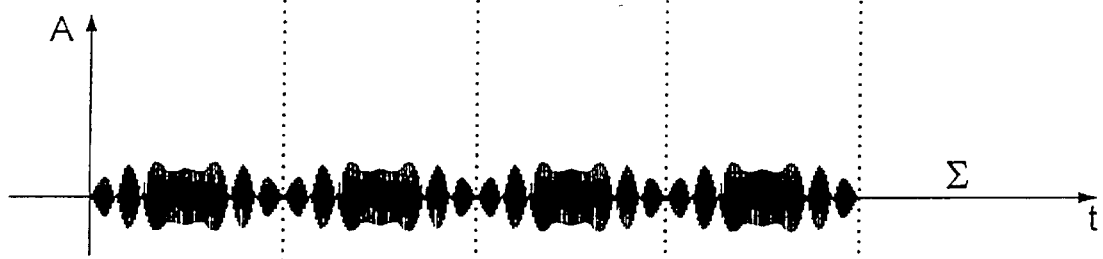
Figure 2I:
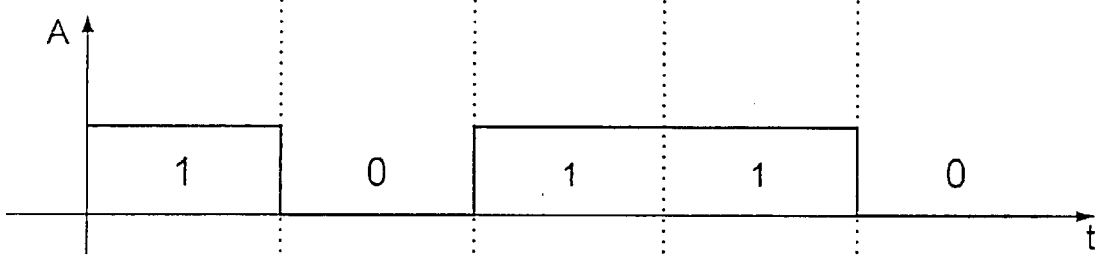
Figure 2J:
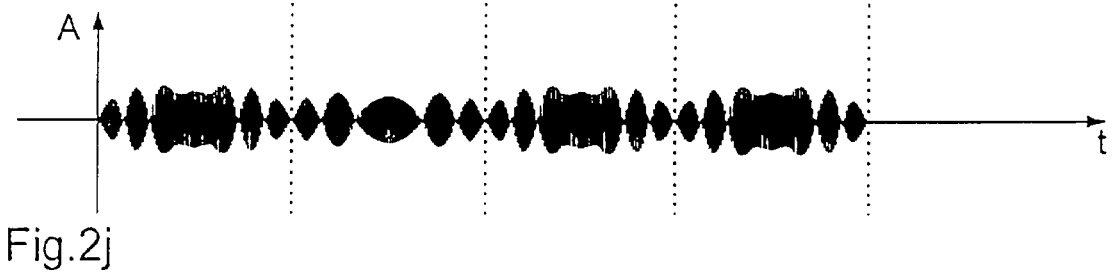
Figure 2K:
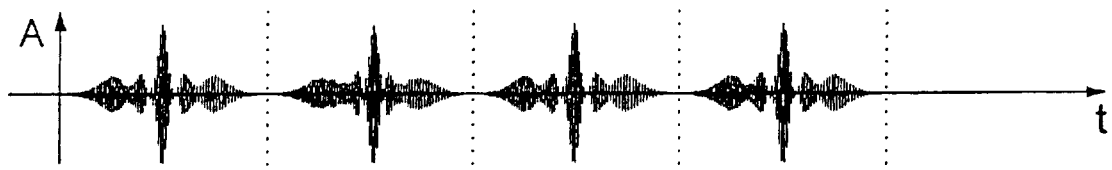
Figure 2L:
Figure 2M:
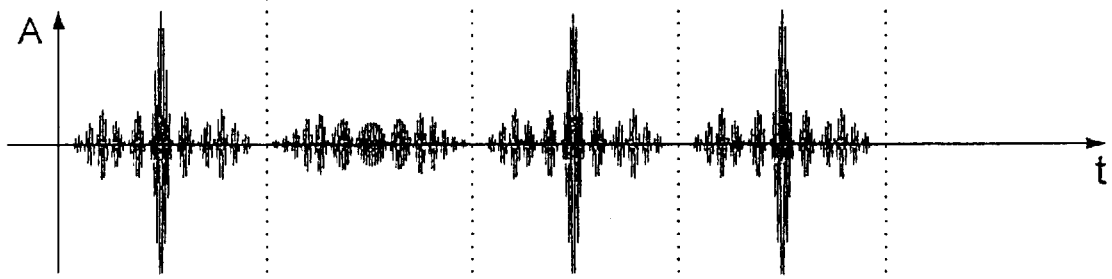
Figure 2N:
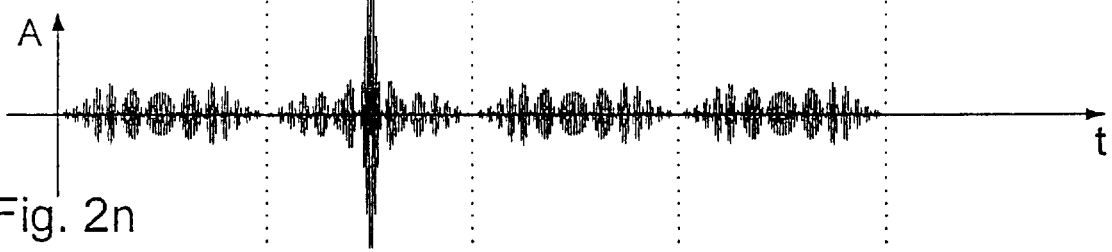
Figure 2O:
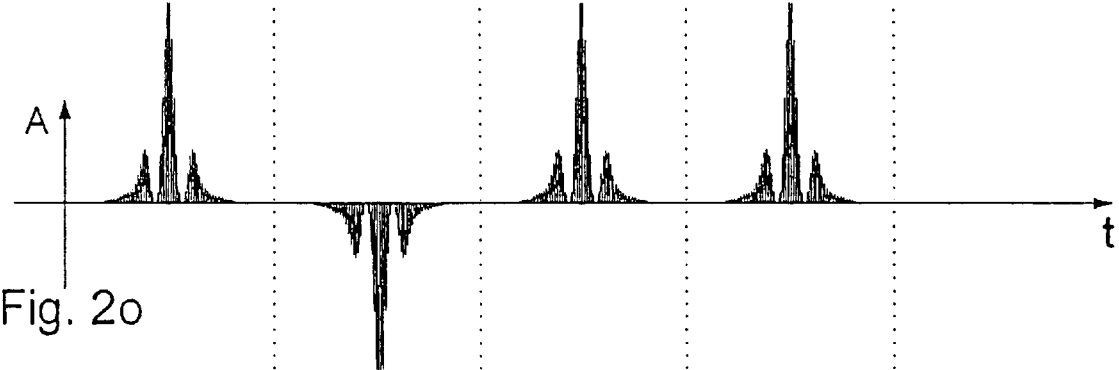
Figure 2P:
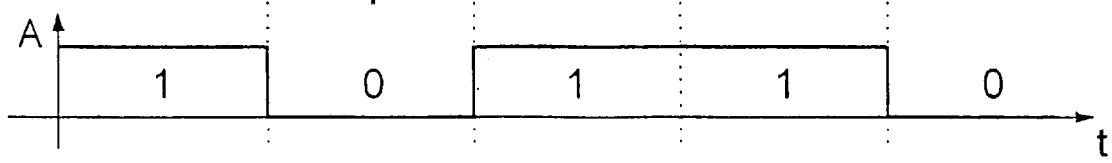

FIG. 1a: a block circuit-diagram of a transmission arrangement as an example for application of the transmission method according to the invention FIGS. 1b through 1f: different noise-suppression modules as block circuit-diagrams for application in different implementation forms of receivers for receiving the signal generated and transmitted by the transmitter represented in FIG. 1a FIGS. 2a through 2p: the signal course at different important points within the block circuit-diagrams represented in the preceding figures FIGS. 3a through 3d: different implementation forms of receivers applying the noise-suppression circuits according to FIGS. 1b through 1f, as examples of receiver arrangements for using the transmission method

DETAILED DESCRIPTION OF THE PREFERRED EMBODIMENTS

The transmitter represented in FIG. 1a in block circuit-diagram form shows an example of the generation of the folded pulse for transmitting, for example, a binary signal present in digitized form via a disturbance-afflicted transmission distance to a receiver represented in FIGS. 3a through 3d; the transmission can take place with predetermined demands on range and security from noise with a relatively small transmission power. In the case of a battery-operated transmitter, the battery life is hereby lengthened, and above all the burden on the environment through electromagnetic radiation (EMI)—also called electro-smog—is decreased in terms of human exposure. Beyond that, due to its relatively small transmission power the transmitter shows a reduced noise potential with respect to other transmit-receive paths (EMC—electromagnetic compatibility) in comparison with other information-transmission systems.

Here, as in the following figures, the circled reference numerals contain in each case cross references to the representation of the associated signal course in the corresponding figures.

Thus, FIG. 2i, for example, shows the signal course of the binary input signal. The above-mentioned transmission with a relatively small transmission power is made possible in the represented transmission system according to the invention by the fact that generated on the transmitter end are folded pulses, which on the receiver end—as will still be described in detail—are time-compressed through dispersion filters, which leads to a corresponding amplitude increase and, through additional correlative signal processing in the analog domain of the receiver, allows a large degree of improvement in the signal-to-noise ratio and through these characteristics makes possible, for example, a reduction of the transmission power or, alternatively, an increase of the range.

For generating the folded pulses, the transmitter displays, first of all, a pulse generator 1, which—as shown in FIG. 2a—generates a continuous series of equidistant rectangular pulses. However, the series of pulses generated by the pulse generator 1 serves here merely for generating folded pulses and contains at first no information. Subsequently, the rectangular pulse series generated by the pulse generator is fed to the pulse former 2, whose task is to change the individual rectangular pulses in each case into very short impulses (quasi-Dirac pulses). The pulse former 2 here replicates the Dirac pulses, which in their mathematical ideal conception are not achievable, through short spike pulses, as show in FIG. 2b.

The series of spike pulses generated in this manner is then fed to a low pass filter 3, whose characteristic filtering curve shows a peaking shortly before the cut off frequency and transforms the spike-shaped pulses into folded pulses (sinc-pulses), as is shown in detail in FIG. 2c.

Subsequent to this, this pulse series is modulated, by means of an amplitude modulator (multiplier) 4, onto a high-frequency carrier oscillation, with the constant carrier frequency $f_t$, generated by the oscillator 5, in order to make possible a wireless transmission. Thus, at the output of the amplitude modulator 4 there appears a series of equidistant carrier-frequency pulses with an sinc-shaped envelope curve in each case, as represented in FIG. 2d. In this connection, it is important that the series of pulses appearing at the output of the amplitude modulator 4 is independent of the digital input signal reproduced in FIG. 2i and therefore carries no information.

The series of pulses modulated onto a carrier frequency is then fed to two parallel-connected dispersive filters 6, 7, which in each case have a preset, frequency-dependent differential time-delay behavior (group time delay behavior) and—as represented in FIGS. 2e and 2f —generate angle-modulated pulses.

The curve profiles represented in FIGS. 2a through 2n are above all intentionally not drawn to scale in the time axis, in order to better illustrate the respective curve profile and its content. In reality the compressed signals are arranged much more narrowly and the chirp-signal portions much more densely upon the time axis.

The dispersion filter 6 here exhibits a group time-delay that increases with the frequency, and consequently generates—as represented in FIG. 2f —angle-modulated pulses with a frequency that increases during the duration of the pulse. The frequency at the output of the dispersion filter 6 thus increases at the beginning of the pulse continuously and monotonically from a value $f_T-\Delta f/2$ lying below the carrier frequency $f_T$ to a value $f_T+\Delta f/2$ lying above the carrier frequency $f_T$.

The group time-delay characteristics of the dispersion filter 7 show, in contrast, a time-delay that decreases with the frequency, so that appearing at the output of the dispersion filter 7 are angle-modulated pulses with a frequency that decreases during the duration of the pulse, as represented in FIG. 2e.

The output signals of the two dispersion filters 6, 7 are next fed to an adder 8 as well as to a subtracter 9 for generation of the folded pulse, so that two different folded pulses are available for information transmission. The selection of the folded pulse to be transmitted takes place here depending on the prevailing value of the binary input signal reproduced in FIG. 2i, which signal is fed first to a bit discriminator 10 for provision of defined signal levels and subsequently controls the switching element 11. During a HIGH-level of the input signal the sum signal generated by the adder 8 is chosen, whereas a LOW-level of the input signal leads the selection of the difference signal of the two angle-modulated pulses. Thus, at the output of the analog switch 11 there appears, as represented in FIG. 2j, an equidistant sequence of different folded pulses corresponding to the prevailing value of the information-carrying input signal.

The signal appearing at the output of the analog switch 11 is then filtered by a bandpass filter 12, which is matched to the carrier frequency $f_T$ of the oscillator 5 and to the bandwidth $\Delta f$ of the folded pulse components, and consequently filters out noise signals lying outside of the transmission band. The signal obtained in this way is then, as is conventional, amplified by an amplifier 13 and radiated by way of the transmitter antenna 14.

FIGS. 1b through 1f show different noise-suppression modules for the receiver. Fundamentally, such noise-suppression modules can be placed in the analog part of a receiver at the input of the receiver after a band-limited input filter, which is not represented here, or they can be accommodated in the intermediate-frequency part of a receiver. All of the noise-suppression modules in FIGS. 1b through 1f are of a fundamental nature and serve the suppression of the noise inside of folded pulses. Thus, they represent only functions and must be realized through appropriate circuits in the HF or LF section of the receiver.

FIG. 1b shows and addition stage. The received folded pulse 2j is fed via a coupling element in a parallel manner to two dispersion filters 15 and 16. The frequency-dependent differential time-delay behavior of these filters is here the reverse of each other, the positively-acting dispersion filter exhibiting a differential time-delay characteristic that shows a parabolic characteristic curve between the frequency and the differential, frequency-dependent delay. Here the parabola belonging to 15 may be open upwards. The dispersion filter 16 has for this purpose the opposite characteristic, i.e. its differential, frequency-dependent time-delay behavior is represented by a parabola that is open downwards. One can also characterize these characteristic curves through the group time-delay; complementary group time-delay characteristic curves in the time and frequency behavior show both positive and negative (rising or falling) courses.

The arrows in the block circuit-symbols 15 and 16, which arrows point in different directions, are intended to characterize in general the different behavior of the dispersion filters; the positive arrow direction is to represent here a so-called "positive dispersion filter" and the arrow pointing in the negative direction a "negative dispersion filter" in the sense used in the description.

As explained in the description, other differential time-delay characteristic curves are also possible, and indeed are required when, at the transmitter end, chirp-signal components are modulated onto other angle-modulation characteristics as a carrier substrate.

At the outputs of the two dispersion filters 15 and 16 there appears in each case a combined signal that consists of a time-compressed pulse with correspondingly increased amplitude and, superimposed on this, a time-expanded pulse. The two output signals 2k and 2l represent symmetrical signal courses that run in a temporally similar manner toward the middle position of the compressed pulse. The output signals of the dispersion filters are additively superimposed via an adder stage 17. The signal appearing at the output of the summing stage shows a reduced noise component relative to the signal, because in the case of the signal the coincident amplitudes are summed and in the case of the noise the values appearing statistically in the phase position and amplitude are added only with respect to their power. The output signal 2m thus exhibits an improved signal-to-noise ratio.

It is advantageous to divide the signal path into two parallel circuits by means of a multiplexer at the input of the noise-suppression modules, which multiplexer connects, in the cycle of the folded-pulse sequence (synchronized operation), the individual folded pulses alternately to one of the modules and in the following cycle to the other module. By means of such a splitting the noise component is reduced to the duration of the folded pulse and, thereby, the superimposed "noise pulse" thus generated is likewise lengthened by the dispersion filter, which contributes to a reduction of the noise portion.

This same description is valid for FIG. 1c as for FIG. 1b; here also two parallel dispersion filters 15 and 16, connected inversely to each other, change the folded signal in each case into a compressed and an expanded portion, and these two signals are subtracted by means of a difference stage. Since addition and subtraction represent processes that are complementary to each other, the signal/noise improvement is the same as for the summation. For the rest, what was said in connection with FIG. 1b holds true here.

However, since according to FIG. 1a sum and difference signals 2h and 2g have been generated, here the summing stage according to FIG. 1b and the difference stage according to FIG. 1c can discriminate the sum and difference signals. Accordingly, one can also connect summing stage 17 and the difference stage 18 in parallel. In that case only one dispersion filter pair 15 and 16 is required. This takes place advantageously upon a single SAW-filter substrate. The signals 2m and 2n arising from the sum and difference formation, which signals exhibit a reduced noise level, must then in the receiver train be fed either to additional amplifiers or to the demodulation.

FIG. 1d shows a multiplicative noise-reduction stage for folded signals and represents as well a module that can be applied inside of an amplifier train. The folded signal 2j is here also led to two dispersion filters 15 and 16, each operating in an opposite manner to the other, at whose respective outputs the combined signals 2k and 2l arise, in the center of which in each case a compressed pulse is located, while the expanded components are the reverse of each other. The product of this multiplication consists of a mixture of the carrier-frequency signals 2k and 2l, which mixture leads to the doubled carrier frequency. Since the signals 2k and 2l are mirror-symmetrically similar in the time and frequency axes, the signal amplitudes, in particular their compressed portions, are squared. Since the frequency position and the frequency portion of these signals multiplied with each other are the same, there arise with the multiplication the sums and the differences of the frequencies of the combined signals multiplied with each other. The spectra are shifted to the doubled frequency, for one thing, and for another a direct, phase-fixed, coherent demodulation takes place. The output 2o thus shows combined signal with a doubled frequency position; at the same time, however, one can connect a low-pass filter after the output and thus obtain directly the demodulated low-frequency signal. This stage, which with a certain justification one can term an autocorrelative noise-suppression circuit, thus squares the temporally coinciding signals and suppresses the non-correlated noise, just as with the autocorrelation of periodic or quasi-periodic signals. Accordingly, this module according to FIG. 1d carries out advantageously three analog processes at the same time, without making necessary a synchronized operation:

1. The folded signal, with its symmetrically-lying (reverse to each other) chirp-signal components, is immediately twice compressed through the oppositely-acting dispersion filters (increasing of the signal amplitude).
2. Through autocorrelative multiplication of the coincident signal portions, the signal is emphasized with respect to the noise (correlative noise suppression).
3. Through the multiplication there arises a combined signal of doubled frequency position in comparison to the original carrier frequency and, at the same time, the low-frequency, demodulated signal (product demodulation ). Aside from amplifiers and band filters, the circuit according to FIG. 1d effects, in addition to the automatic noise suppression and the automatic signal increase, also an automatic demodulation and therefore represents very important functions of a receiver.

FIG. 1e represents once again a noise-suppression module of a different type, which, however, is also characterized through outstanding noise-suppression properties. In particular for the folded signal 2j at the input of the noise suppression stage, this type of noise suppression is especially well suited for synchronizable data transmission. It is likewise characterized through a splitting up of the signal, by means of a splitter, into two signal branches, of which the upper one in the figure displays a series connection of a positive dispersion filter 20, an analog switch 22, and a negative dispersion filter 24.

In the lower branch represented in the figure, the same series connection of a negative dispersion filter 21, an analog switch 23, and a positive dispersion filter 25 is represented. Both branches are fed via a difference stage 26 to an output. The circuit is best understood when one visualizes the switches 22 and 23 situated in the center as initially closed. In this configuration no signal can appear at the output of the circuit, i.e. after the difference stage 26, because in the dispersion filters 20 and 24 or 21 and 25, respectively, acting in both branches in each case in a manner opposite to each other due to their opposite characteristics, the frequency-dependent shifts that the first filter in each case effects is canceled again in the second filter. Thus, with the switches closed, signal and noise portions that are given to the branching cancel each other out at the output of the two branches after 24 and 25 through the difference stage 26, so that at the output neither noise nor signal can appear.

Since, however, at the outputs of the two oppositely-acting dispersion filters 20 and 21, precisely as in the previously described arrangements, e.g. according to FIG. 1d, mirror-symmetrical, coincident, and combined signals are generated, which signals consist in each case of a compressed and an expanded component, the switch can be actuated through a switch signal by way of the input 27 in such a manner that the switch, for example during the short time of the mean duration 6 of the compressed signal, virtually cuts out the latter through interruption of the signal path in both branches and thus removes from the combined signal in both branches the compressed component, in such a way that the signals in the two branches become unequal and consist in each case only of their expanded components, or at least approximately. Since, however, the folded signals, due to their chirp signal components that are the reverse of each other, generate after the first pair of the parallel-connected dispersion filters 20 and 21 chirp signals that are expanded to doubled duration in a reverse manner to each other, by means of the switch these extended components are interrupted briefly in their temporal middle, so that at the output of the switches 22 and 23 in each case extended components that are the reverse of each other also remain, in the middle of which a comparatively short segment has been cut away by the interruption.

Since for these extended portions in both branches the temporal position of the frequency portions holds steady, these two expanded signals in both branches are compressed again to the original length by the second dispersion filter pair 24 and 25. Accordingly, the dispersion filter 24 cancels the expansion that has been effected by the dispersion filter 20 in the upper branch. The same thing takes place through the dispersion filter 25 for the shifting done by the filter 21 in the lower branch.

Since the mean duration of the compressed pulse 6 according to the compression factor $\psi$ is very much shorter than the doubled duration $\Delta t$ of the original folded pulse, the error that arises during the cutting out of the compressed pulse for the signal portions expanded in each case is relatively slight.

Thus, at the output of the dispersion filters 24 and 25 there are now present after the cutting-out technique two chirp pulses that are, in each case, the reverse of each other, which pulses cannot cancel each other out by virtue of the contrary frequencies during the difference formation, simply because they are unequal signals.

This noise-reduction unit according to FIG. 1e is in many respects theoretically and practically interesting, because it allows, in a simple manner, a demonstration of the fact that as the ratio $\Delta t/\delta = \psi$ becomes larger and larger, the error that is made by the cutting-out technique becomes smaller and smaller, or, to say the same thing, the noise reduction becomes better and better.

Thus, for the noise, the same thing is fundamentally valid as for the signal. In both branches the noise, which is shifted by the dispersion filter 20 according to its spectral distribution, is recombined by the dispersion filter 24, which acts in a manner opposite to that of 20, except for the small (in percentage terms) central part, which has been interrupted by switches. The same holds true in the lower branch according to FIG. 1e. Accordingly, the noise, except for the cut-out portion, which is small in terms of energy, becomes equal in the upper and lower branches and is eliminated by the difference stage 26. That means, therefore, that in accordance with the compression factor $\psi$ there appears at the output of this noise-suppression circuit according to FIG. 1e again a folded pulse, from which is missing in the middle a few oscillation portions and whose noise portion is to a great extent suppressed by the difference formation.

The folded signals whose S/N ratio has been improved in such a way can then be passed on and additionally processed autocorrelatively through, for example, once again a circuit according to FIG. 1d, whereby further noise portions are eliminated.

Here an advantage of these noise-suppression modules becomes evident. Since they are based on physically different effects with respect to the elimination of the noise portions, they can be combined independently of one another. Similar results can also be achieved when one interrupts the combined signal not for the duration of the compressed pulse, but rather, conversely, closes the switches only for this duration $\delta$, thus selects the compressed pulse, which is then expanded again in both branches to the original length by the dispersion filters. In the process there survives, to be sure, only the short-time noise portion, which is allotted to $\delta$, but it is expanded again to the original duration by the dispersion filters; its energy portion is, however, very much smaller than originally for the time $2\Delta t$.

FIG. 1f shows an additional modification of the circuit according to FIG. 1e. Here the switches 22 and 23 are merely substituted in the longitudinal branches by multipliers 28 and 29. Since switches and multipliers can achieve a similar effect, it is especially advantageous in the circuit according to 1f to replace the cutting out through switching in FIG. 1e with a multiplicative suppression according to FIG. 1f, because this makes possible, according to optimal filter theory, the least distortion of the extended pulse.

Since its fundamental manner of operation is the same as that of FIG. 1e, an explanatory description will be dispensed with. However, it is important that the synchronized multiplier pulses, which are fed to the two multipliers in parallel on the conductor 39, are for practical purposes signals of amplitude 1 that, synchronously timed in the temporal middle of the folded pulses of the combined signals, are switched to zero at the input of the multipliers according to the course of a split function (sinc function), in such a manner that they represent an inversion of the normalized envelope of the compressed signal portion of the combined signal during the time $\delta$. Through this they suppress by multiplication precisely this compressed portion. The suppression signals thus represent nothing other than an inverted sinc function that is clipped at zero. To be sure, this circuit presupposes a synchronous operation; that, however, is quite standard in the demodulation of a sequence of pulses.

Represented and described in FIGS. 1b through 1f were noise-suppression components that in principle can be used independently of one another, because they are all characterized by different physical effects on the combined signal.

Figure 3A:
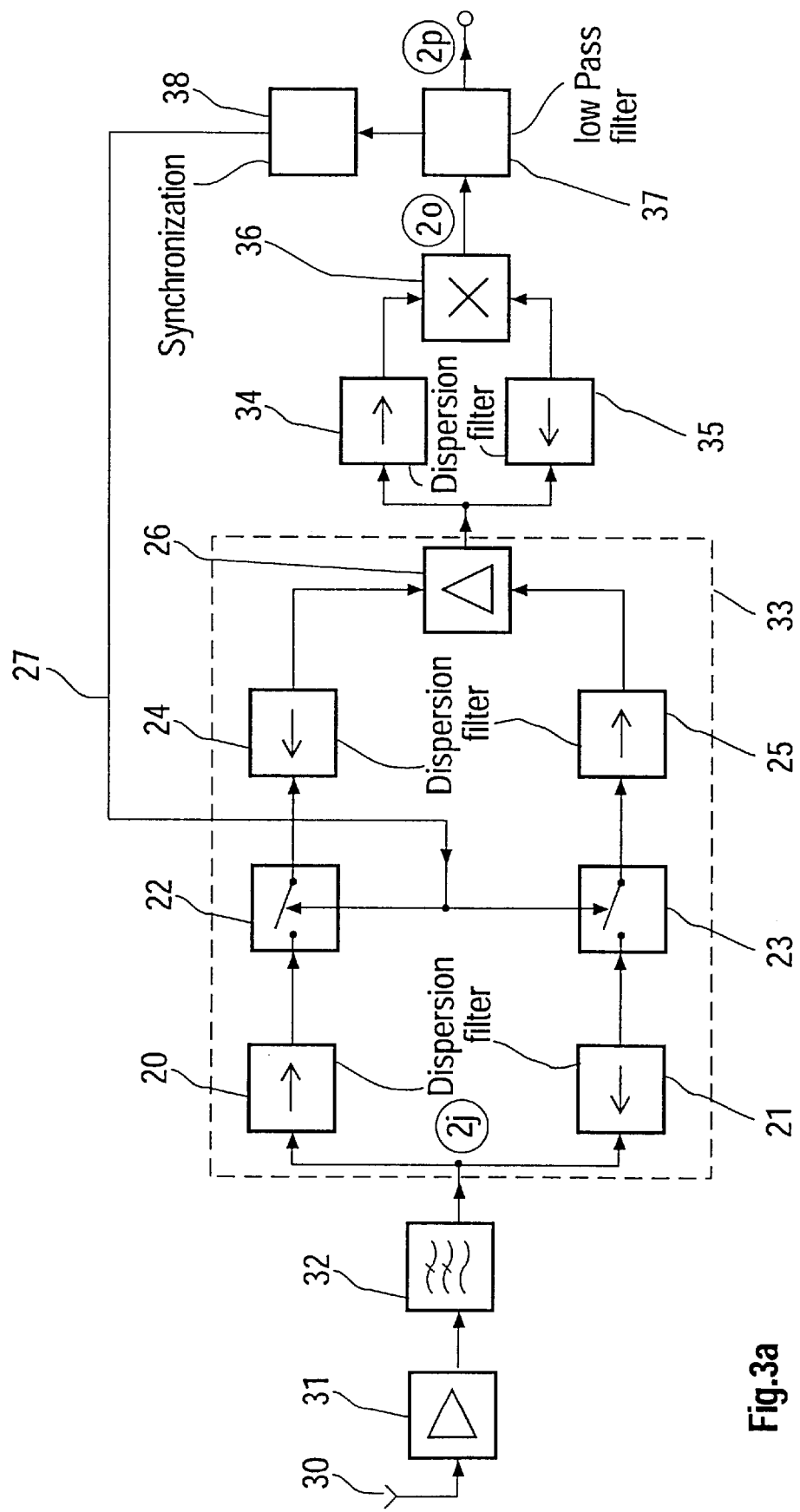

FIG. 3a shows such a combination of the noise-suppression modules according to FIG. 1e and FIG. 1d. The carrier-frequency folded signal coming from the antenna 30 can be amplified by a preamplifier 31 and, by means of a bandpass filter 32, freed of noise lying outside the receiver bandwidth. The high-frequency folded signal 2j is then improved in its signal-to-noise ratio, as it were passively, in the noise-suppression module 33, which is the same as was described in relation to FIG. 1e, and is thereupon subsequently freed of additional noise portions by the correlative stage, as it was described in relation to FIG. 1d, and simultaneously converted back to the low-frequency signal through multiplicative demodulation 36. The following circuit components correspond to the prior art. Accordingly, provision can be made, for example, in 37 for a low-pass filter for filtering of the low-frequency signal; in addition, the signal can be discriminated and formed in its pulse length via a threshold. Additionally, in 38 synchronization stages should be located, which stages generate the switching pulses for the switches 22 and 23 in such a manner that their temporal position comes to rest precisely in the center of the combined signals with respect to the output of the dispersion filter 20 or 21, as the case may be. The duration of the switching pulse can be advantageously somewhat shorter than the mean pulse duration $\delta$ of the compressed signal.

Figure 3B:
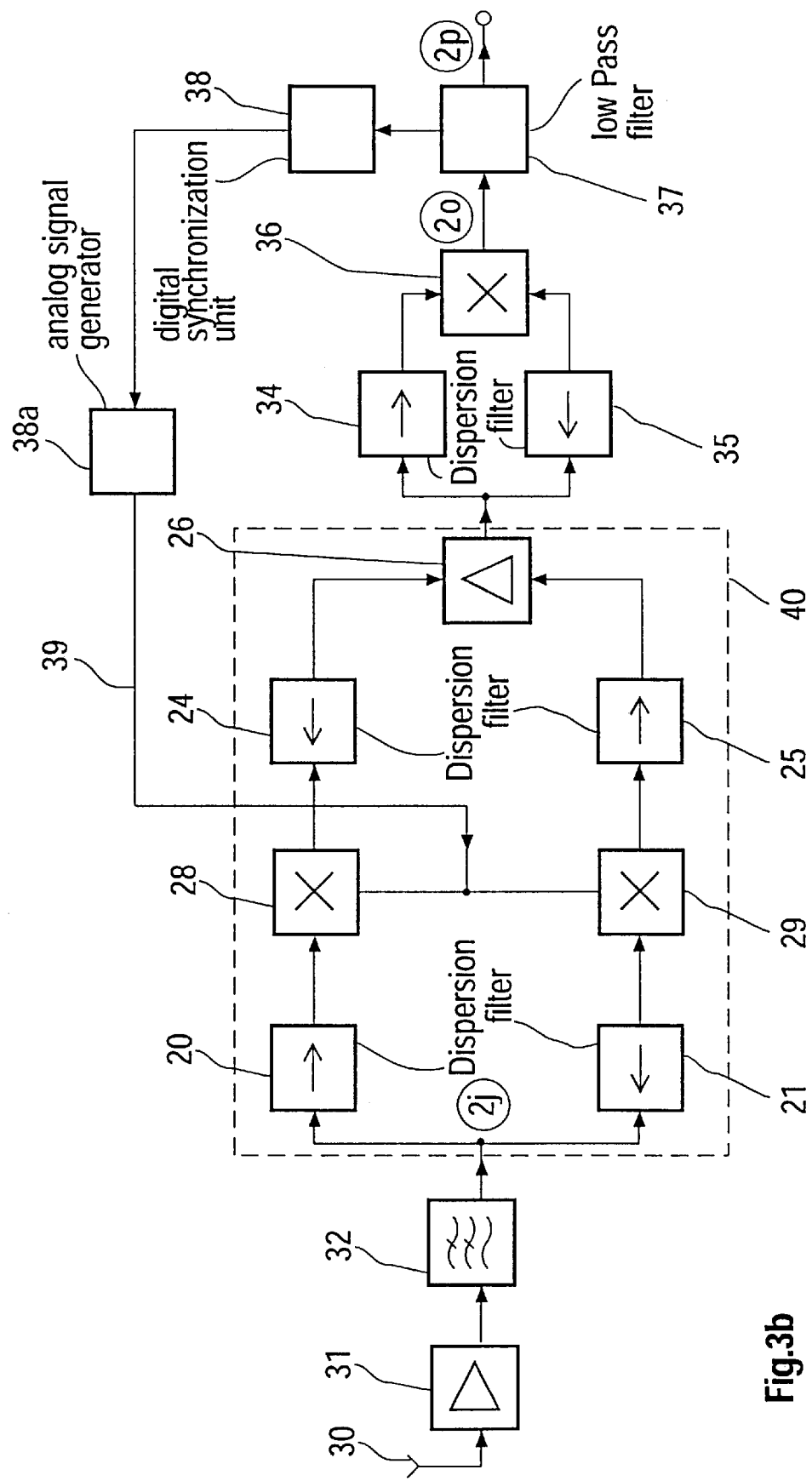

The description of FIG. 3b is identical to the description for FIG. 3a in terms of function, but instead of the switches 22 and 23 provision is made here for multipliers 28 and 29; by way of the conductor 39, split pulses that are inverted and clipped at zero are fed to the multipliers, as it was described in relation to the circuit according to FIG. 1f. The form of such pulses can be optimized according to the noise.

Figure 3C:
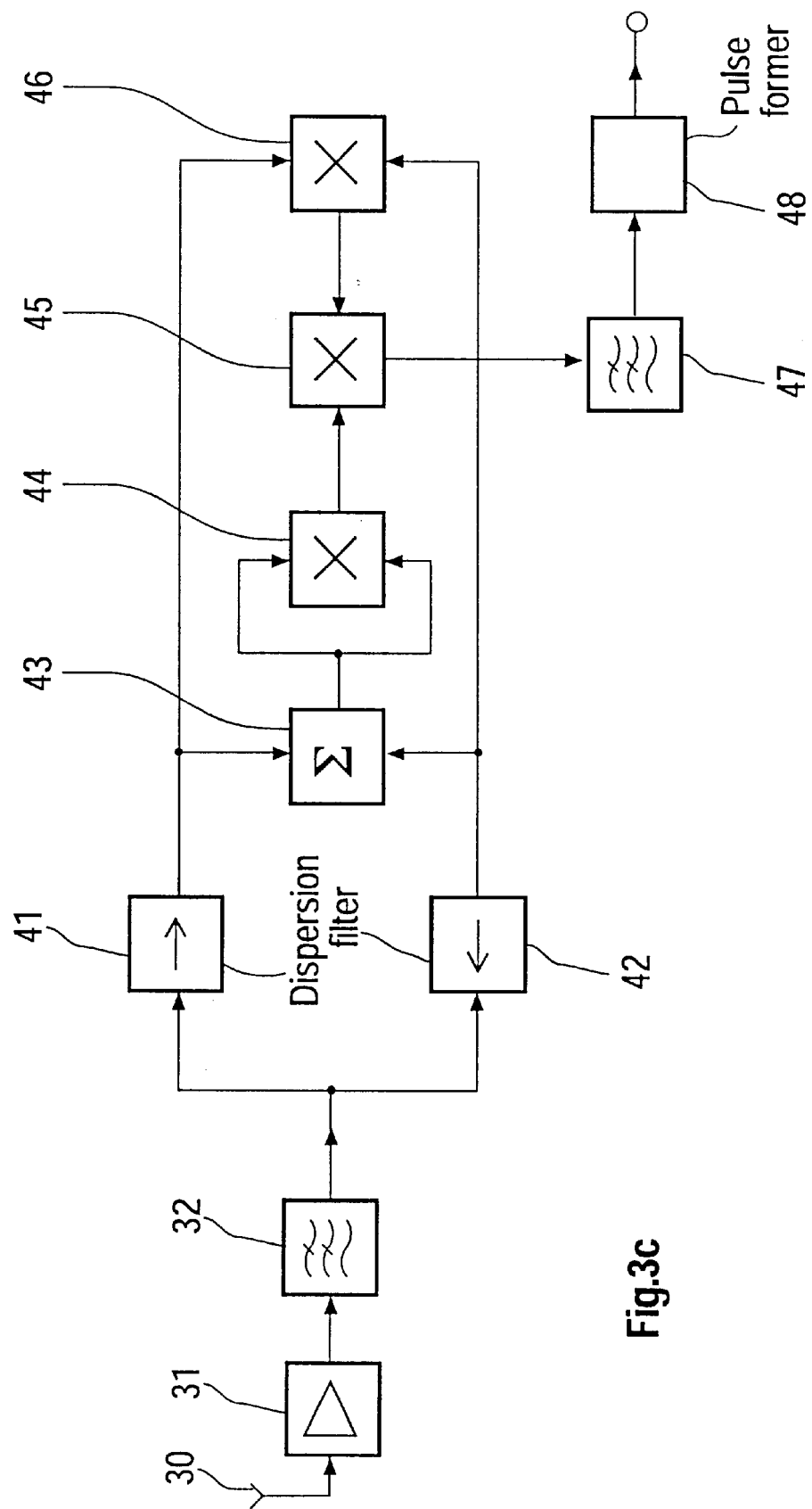

FIG. 3c likewise shows a receiver circuit in which two of the noise-suppression modules according to FIG. 1b and according to FIG. 1d are used. The circuit functions as follows: The carrier-frequency signal at the antenna 30 is conducted through a preamplifier 31 and a following bandpass filter for the carrier-frequency bandwidth. At the output of this bandpass filter the folded signal is split into branches and, as already known, led through two parallel-connected, oppositely-acting dispersion filters 41, 42. The outputs of the two dispersion filters are conducted once to a summing stage 43 and, parallel to this, to a multiplication stage 46, the summing stage operating as described for FIG. 1b and the multiplication stage as described for FIG. 1d. Thus, at the output the summing stage 43 appears a signal whose S/N ratio is improved through additive correlation.

The signal lies in the carrier-frequency region and is given to the squaring stage, consisting of a multiplier 44, in order to obtain at the output of the latter a signal that lies in a carrier-frequency region whose center frequency corresponds to the doubled carrier frequency of the original folded signal.

Simultaneously, there appears at the output of the squaring stage not only a signal with doubled carrier frequency, but also the low-frequency signal through the quadratic mixture. The output of the multiplier 46, which acts as an autocorrelative multiplier, likewise contains the carrier-frequency signal with doubled carrier frequency as well as the LF signal. If one multiplies these two outputs, i.e. multiplies once again the output of the multiplier 46 and the output of the squaring stage 44 via the multiplication stage 45, the coincident signals in the HF and LF regions again become correlated, thus multiplied in a noise-suppressing manner; since the output of the multiplier 46 also contains the squared LF signal, by means of a low-pass filter 47 and a pulse-former stage 48 the original low-frequency signal, as, for example, a pulse sequence or a PPM sequence, can be removed according to the basic type of modulation used.

Figure 3D:
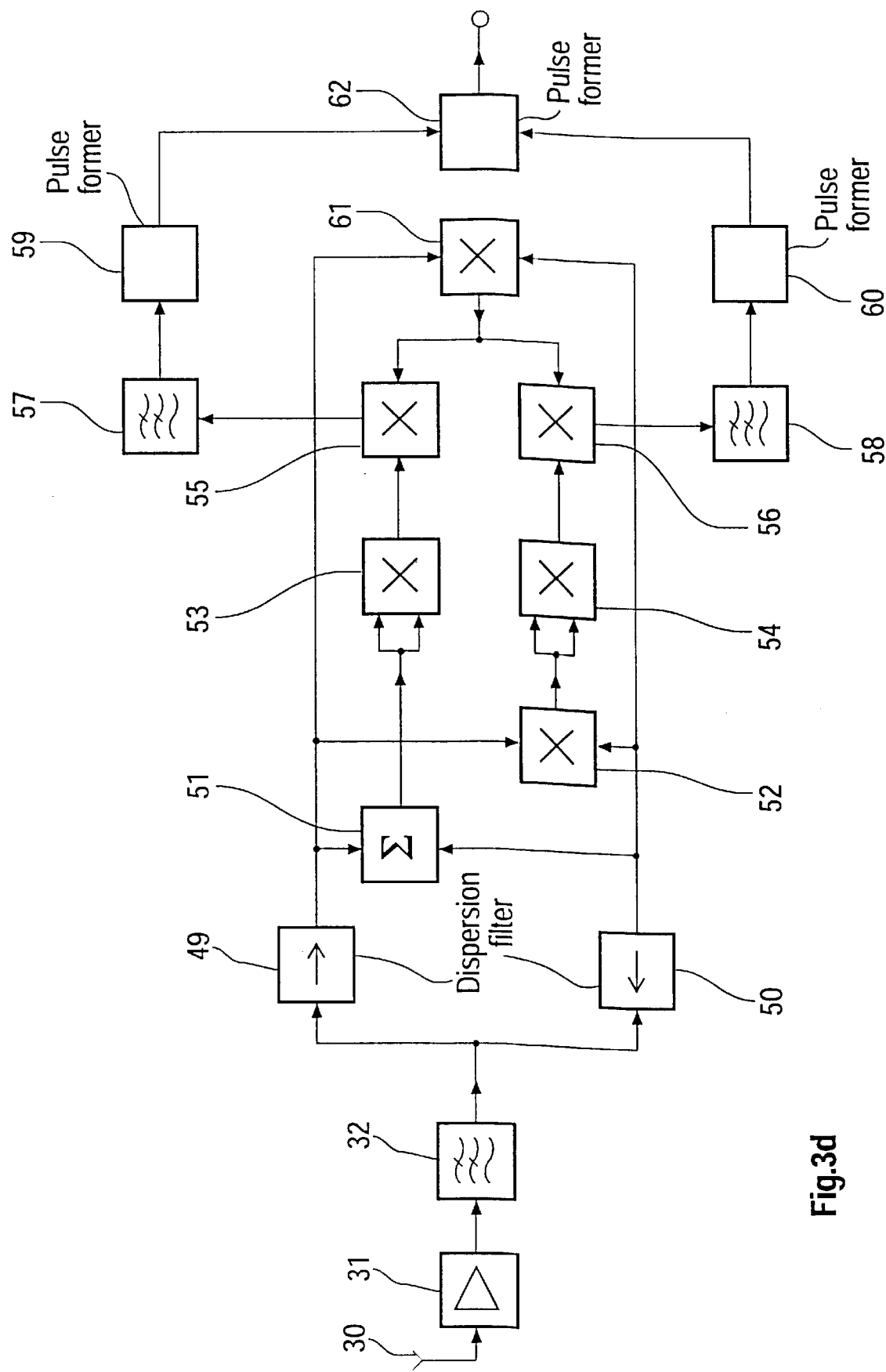

FIG. 3d represents an expansion of the principle applied in FIG. 3c, insofar as here the circuit according to FIG. 3c just now described has been expanded by a difference-forming stage 52 with subsequent squaring stage 54, as well as a multiplier 56, low-pass filter 58, and pulse-former stage 60 analogously to FIG. 3c. Thus, in FIG. 3d not only is the sum of the combined signals from the dispersion filters 49 and 50 taken through the summing stage 51, but also, parallel to this, the difference of the combined signals is taken through the difference stage 52 and both signals, that coming from the summing stage and that coming from the difference stage, are multiplicatively demodulated several times in a manner analogous to the principles represented by FIG. 3c. From that point of view, the circuit according to FIG. 3d presents a possibility of demodulating separately in the receiver according to FIG. 1a the sum and difference signals, as they are generated according to FIG. 1a in the transmitter.

In order to further deepen the understanding of the multiple possibilities represented here, in order to give a clear rule for technical action, and to make appropriate decisions easier, in the following the fundamental concepts and possibilities are once again explained in a summary fashion.

The block circuit-diagrams here presented, for example, in FIG. 1a as the transmitter and in FIGS. 3a, 3b, 3c, and 3d as the receiver, on account of the general nature of the tasks, are of only a fundamental nature and show examples of how the different noise-suppression modules according to FIGS. 1b, 1c, 1d, 1e, and 1f can be used as building stones for signal/noise improvement in the receiver and show examples of how in the analog folded-pulse signal processing two parallel-connected dispersion filters, inverse to each other, can be put together with subsequent summing, difference, multiplier, and squaring stages for the mirror-symmetrical, combined signals for noise suppression or iterative noise suppression in the most different circuits placed together into more or less elaborate blocks, as they may be combined according to the opinion of the specialist. Thus, they offer as building stones a wealth of possibilities of applying noise-suppression circuits with little effort, thus cost-effectively, or with more effort, but then more effectively, for S/N improvement in the analog section of a receiver. By means of the noise-suppression modules according to FIG. 1e or FIG. 1f with the switches or multipliers situated in the longitudinal branches, which multipliers both work on the time axis in synchronizable operation, according to the compression factor a considerable noise suppression can be achieved. Also, these modules can be built into such receiver paths individually or in a supplementary manner. But while the automatically operating modules according to FIGS. 1b, 1c, and 1d can be used for asynchronous or synchronous operation, the modules according to FIGS. 1e and 1f are applicable only for synchronizable operation.

The process- and production-engineering interest in all of the modules is the fact that with the application of SAW filters, several SAW filters can be arranged as multiple dispersion filters on one ultrasonic substrate, from which filters summing and difference stages in the ultrasonic range can be developed and produced. Through appropriate connections, universally applicable SAW-filter modules can be formed, from which—according to the application and combination—noise-suppression circuits with silicon chips can be assembled, upon which chips multipliers or switches, for example, can be located. It is then left to the specialist to undertake appropriate reconnections in more or less elaborate and effective ways.

The folded pulses thus offer, by their special, multicorrelatable characteristics, through symmetrical system strategies quite valuable and effective possibilities for the development of modern transmission systems that are characterized by a considerable improvement in signal/noise ratio and consequently make possible an energy-saving, reliable communications operation for information transmission, and which in addition can serve to reduce the human exposure.

The invention is not limited in its implementation to the above-specified, preferred implementation examples. Rather, a number of variants are conceivable, which variants make use of the solution presented in fundamentally different types of implementations.

What is claimed is:

1. A method for transmitting or storing a communication impressed upon a signal from a transmitter over a transmission distance to a receiver in mobile communication, wherein an input signal in the transmitter is subjected to a modulation and passes over the transmission distance to the receiver, whereby in a case of communication storage, a writing unit takes the place of the transmitter and a reading unit takes the place of the receiver, the method comprising:

transmitting angle-modulated pulses with temporally opposite angle modulation occurring during the duration of the pulse, wherein pairs of pulses are superimposed by a first superimposing element into a folded pulse, whereby folded pulses transmitted to the receiver carry a communication impressed upon them according to a modulation or encoding process;

filtering the folded pulses in the receiver through at least two dispersion filters connected in parallel in pairs with frequency-dependent group delay characteristics, whereby the frequency-dependent group delay characteristic of both dispersion filters is matched to the angle modulation in one of the two pulses forming the folded pulse through their superposition, wherein both dispersion filters output a combined signal that consists of a time-compressed pulse with a correspondingly increased amplitude and a time-expanded pulse with a correspondingly diminished amplitude; and combining the combined signals appearing at the outputs of both dispersion filters by a second superimposing element.

2. The method according to claim 1, wherein the folded pulses are generated by the first superimposing element through addition or subtraction of pairs of angle-modulated pulses with temporally opposite courses.

3. The method according to claim 2, wherein with a binary pulse sequence to be transmitted, the folded pulses are generated at the transmitter in dependence on a binary value of the communication to be impressed, either through addition or through subtraction of two temporally-opposed angle modulated pulses.

4. The method according to claim 1, wherein the output signals of both dispersion filters provided at the receiver are added, subtracted or multiplied by the second superimposing element.

5. The method according to claim 1, wherein the output signal of the second superimposing element is fed to two inputs of a multiplier for noise suppression.

6. The method according to claim 1, further comprising:
  dividing the received signal into two parallel branches and filtering through two series-connected dispersion filters, whereby series-connected dispersion filters display a frequency-dependent delay behavior that is inverse with respect to each other;
  interrupting or releasing signal flow in the two branches in the middle of each pulse at a preset point in time by a controllable switching element arranged between the two dispersion filters or by a multiplier; and
  combining the two branches at the output end via a subtracter.

7. An arrangement for transmitting and storing a communication impressed upon a signal with a transmitter for accepting and transmitting a communication-bearing input signal and a receiver for recovery of the input signal, the arrangement comprising:
  a transmitter, for generation of at least two temporally opposed angle-modulated pulses, the transmitter comprising:
    at least two pulse generators that are connected at an output;
    a first superimposing element connected to the output for generation of a folded pulse consisting of two angle-modulated pulses; and
    a modulator for impressing information contained in the input signal onto the folded pulse; and
  a receiver, for the processing of the received folded pulse, the receiver comprising:
    two dispersion filters with frequency-dependent delay characteristics, whereby the frequency-dependent delay characteristic of both dispersion filters is matched to the angle modulation of one of the two pulses forming via superposition the folded pulse wherein at the output of both dispersion filters a combined signal appears which consists of a time-compressed pulse with a correspondingly increased amplitude and a time-expanded pulse with a correspondingly diminished amplitude; and
    a second superimposing element connected downstream from the two dispersion filters which combines the output signals of the two dispersion filters.

8. The arrangement according to claim 7, wherein the two pulse generators connect to a dispersion filter with frequency-dependent delay characteristics for generation of oppositely angle-modulated pulses, whereby one dispersion filter displays a delay time that decreases monotonically with frequency and another dispersion filter displays a delay time that increases monotonically with frequency.

9. The arrangement according to claim 7, wherein the first superimposing element includes one of an adder and a subtracter.

10. The arrangement according to claim 9, wherein the information-carrying input signal includes a binary pulse sequence and the modulator includes a switching element controllable through the input signal, the switching element is connected at the input to the adder or the subtracter for selecting either the sum or the difference of the two oppositely angle-modulated pulses.

11. The arrangement according to claim 7, wherein the second superimposing element includes an adder, a subtracter or a multiplier.

12. The arrangement according to claim 7, wherein an output of the second superimposing element is connected to both inputs of a multiplier for autocorrelation.

13. The arrangement according to claim 7, wherein the receiver further comprises:
  a noise suppression circuit that consists essentially of:
    two parallel-connected branches that at the output are connected to the inputs of a subtracter and two dispersion filters with frequency-dependent delay characteristics that are opposite each other, are connected in series, whereby in each of the two branches an analog switching element is connected between the two dispersion filters for suppression or switching-through of the signal flow, the analog element controlling signal flow in the cycle of synchronization through switching signals that are generated according to position and duration by a digital synchronization unit.

14. The arrangement according to claim 7, wherein the receiver further comprises:
  a noise-suppression circuit that consists essentially of:
    two parallel-connected branches that at the output are connected to the inputs of a subtracter and two dispersion filters, with frequency-dependent delay characteristics that are opposite each other, are connected in series, whereby in each of the two branches a multiplier is connected between the two dispersion filters for suppression or switching-through of the signal flow, which multiplier is connected at the inputs to a preceding dispersion filter and to an analog signal generator, which generator is controlled through the digital synchronization unit and which generates signals in the cycle of synchronization for multiplication, the signals displaying a profile, deviating from a rectangular signal, for suppression or release of portions of the signal course through multiplication.

15. The arrangement according to claim 7, wherein for noise suppression in the receiver a noise-suppression circuit is provided for dividing the signal flow at the receiver, including two parallel-connected branches, in which is arranged a dispersion filter with a frequency-dependent delay characteristic whereby one dispersion filter displays a delay time that decreases monotonically with frequency and another dispersion filter displays a delay time that increases monotonically with frequency and the two dispersion filters at the output are connected with the inputs of an adder or of a subtracter or of a multiplier.

* * * * *